(12) United States Patent
Dundas et al.

(10) Patent No.: US 6,994,821 B1
(45) Date of Patent: Feb. 7, 2006

(54) DUAL PARISON BLOW MOLDING AND METHOD

(75) Inventors: Dennis L. Dundas, Dover, PA (US); Kristopher J. Ivie, York, PA (US)

(73) Assignee: Graham Engineering Corporation, York, PA (US)

( * ) Notice: Subject to any disclaimer, the term of this patent is extended or adjusted under 35 U.S.C. 154(b) by 288 days.

(21) Appl. No.: 10/628,830

(22) Filed: Jul. 28, 2003

(51) Int. Cl.
*B29C 49/04* (2006.01)
*B29C 49/36* (2006.01)
*B29C 47/26* (2006.01)
*B29C 47/28* (2006.01)

(52) U.S. Cl. ............... 264/515; 264/543; 425/532; 425/540; 425/133.1

(58) Field of Classification Search ............ 425/133.1, 425/523, 532, 540, 463; 264/515, 527, 540, 264/543
See application file for complete search history.

(56) References Cited

U.S. PATENT DOCUMENTS

| | | | |
|---|---|---|---|
| 2,674,006 A | 4/1954 | Bailey et al. ............... 425/532 |
| 3,225,382 A | 12/1965 | Hagen ........................ 425/531 |
| 3,564,653 A | 2/1971 | Sparks et al. ............... 425/532 |
| 3,583,031 A | 6/1971 | Kader et al. ................ 425/534 |
| 3,767,345 A | 10/1973 | Doughty et al. ............ 425/532 |
| 3,802,823 A | 4/1974 | Doughty et al. ............ 425/532 |
| 3,819,777 A * | 6/1974 | Vermeerbergen ............ 264/540 |
| 3,843,305 A | 10/1974 | Doughty et al. ............ 425/540 |
| 4,007,244 A | 2/1977 | Avery et al. ................ 264/40.7 |
| 4,076,477 A | 2/1978 | Hacke ...................... 425/192 R |
| 4,208,175 A | 6/1980 | Rosenbaum ............. 425/131.1 |
| 4,395,217 A | 7/1983 | Benadi .................... 425/382 R |
| 4,522,775 A * | 6/1985 | Briggs et al. ............. 425/133.1 |
| 4,940,403 A | 7/1990 | Hirschberger ............ 425/133.1 |
| 4,954,310 A * | 9/1990 | Andersen .................... 425/540 |
| 5,102,602 A | 4/1992 | Ziegler .................... 264/209.2 |
| 5,551,862 A | 9/1996 | Allred, Jr. ................... 425/532 |
| 5,556,648 A | 9/1996 | Budzynski et al. ......... 425/150 |
| 5,616,350 A | 4/1997 | Wissmann et al. ....... 425/133.1 |
| 5,705,121 A | 1/1998 | Allred, Jr. ................... 264/543 |
| 5,840,349 A | 11/1998 | Brown, Jr. et al. ......... 425/532 |
| 6,471,907 B1 | 10/2002 | Krall et al. ................. 264/509 |
| 2002/0136794 A1 | 9/2002 | Cargile et al. ............. 425/532 |

OTHER PUBLICATIONS

Unnumbered Graham Engineering Corporation Drawing dated Dec. 16, 1997.
Unnumbered Graham Engineering Corporation Drawing, no date.
"Support to Graham Container," D. Graham, Sep. 21, 1988.
"Inter-Office Correspondence," Joe Spohr, Sep. 16, 1997.
"Inter-Office Correspondence," Tom Kurtz, Jan. 8, 1998.
"Graham Engineering Corporation," Hal Koplin, Dec. 23, 1997.
"Graham Packaging and Graham Engineering" Jan. 5, 1999.

* cited by examiner

*Primary Examiner*—Robert B. Davis
(74) *Attorney, Agent, or Firm*—Hooker & Habib, P.C.

(57) ABSTRACT

A vertical rotary blow molding machine with dual cavity molds includes two coextrusion flow heads for extruding multi-layer parisons for capture and blowing in the dual cavity molds.

37 Claims, 5 Drawing Sheets

DUAL PARISON BLOW MOLDING AND METHOD

FIELD OF THE INVENTION

The invention relates to vertical rotary blow molding machines with two cavity molds and a dual parison extrusion assembly for simultaneously extruding two parisons for capture in the mold cavities and blow molding bottles in the mold cavities, and to related methods.

DESCRIPTION OF THE PRIOR ART

Continuous vertical rotary blow molding machines with single cavity molds are well known. In these machines a set of molds is mounted around the circumference of a vertical wheel. A drive rotates the wheel to move open mold halves past a single parison extrusion head and then closes the molds on a parison extruded by the head to capture a portion of the parison in each mold cavity and subsequently blow the parison to form a blow molded article, typically one or two bottles.

Each vertical rotary blow molding machine requires a wheel, a set of molds, an extrusion head, an extruder and piping connecting the extruder to the head. In machines blowing multi-layer bottles, a multi-layer extrusion head and multiple extruders and related piping are required. A control system is required for the machine.

Recently, dual parison vertical rotary blow molding machines have been introduced. These machines offer increased production at reduced cost over single cavity vertical rotary blow molding machines. Dual parison machines use molds having two radially spaced mold cavities, rather than a single cavity mold, and a dual parison extrusion assembly having radially inner and radially outer flow heads for extruding two parisons to be captured in the radially inner and radially outer mold cavities. Dual parison vertical rotary wheels offer considerable efficiencies over single parison wheels, particularly because the capacity of the wheel can be doubled at moderate incremental cost.

Single cavity vertical rotary wheels use flow heads extruding single layer parisons or multi-layer (coextrusion) parisons. The open mold halves which close to capture the single parisons pass to either side of the flow head. The head must be narrow to fit between the open mold halves. Melt pipes flowing high pressure molten resin to a single layer or coextrusion flow head extend radially inwardly from the extruder to the flow heads. Positioning of the melt pipe is straightforward for single parison flow heads. The melt pipe can extend radially inwardly from the extruder to the single parison flow head within the width of the flow head.

In one dual parison vertical rotary blow molding machine using two single layer flow heads resin is flowed radially inwardly from extruders located away from the wheel through melt pipes located one over the other, with the upper melt pipe feeding the radially outer flow head and with the lower melt pipe feeding the radially inner flow head.

In another dual parison machine, the melt pipes extend radially inwardly with one pipe on each side of the extrusion heads and then bend inwardly to join the inner and outer extruders on opposite sides. These pipes increase with the width of the extrusion heads.

Present dual parison machines cannot extrude multi-layer or coextrusion parisons. Accordingly, while dual layer vertical rotary blow molding machines offer increased efficiency in comparison to single parison vertical rotary blow molding machines, these machines have not previously offered the ability to manufacture multi-layer bottles. Present dual cavity machines cannot manufacture bottles with barrier or regrind layers with the result that these types of bottles must be manufactured on single parison machines.

Accordingly, there is a need for an improved dual parison vertical rotary blow molding machine for dual cavity manufacture of multi-layer blow molded bottles. The two parison extrusion heads for the machine should be capable of extruding multi-layer parisons having regrind and barrier and adhesive layers as required. The extrusion heads should be sufficiently narrow to fit within the gap between open molds in the rotary machine. Resin flow passages leading to the two flow heads should extend through the flow heads and should not be located outside of the heads.

Additionally, the extrusion mouths of the coextrusion flow heads should be located as close as possible to the sides of the molds when the molds close to capture the parisons in order to reduce the cord length of the unsupported molten parison prior to capture and improve location of the parisons when captured.

Additionally, when an extruder flows resin to each of the two flow heads the melt pipes leading to the two flow heads should be pressure isolated from each other so that the pressure of the resin in one flow head does not affect the pressure of the resin in the other flow head.

SUMMARY OF THE INVENTION

The invention is a dual parison extrusion head assembly for use in a vertical rotary blow molding machine and related methods of extruding two multi-layer parisons for dual cavity rotary blow molding. The assembly includes a body with radially inner and radially outer coextrusion heads mounted side-by-side with internal resin flow passages having inlet ends located away from the path of movement of open molds past the body. The resin flow passages are connected to extruders through a manifold assembly and flow pipes. The width of the body is minimized to permit open molds to rotate freely past opposite sides of the body before closing and capturing the parisons in the mold cavities.

Capture of the dual parisons in the two mold cavities is improved. The length of the parison chords between the flow mouths and the preceding mold is reduced by positioning the radial inner extrusion head a distance above the radial outer extrusion head so that the extrusion mouths of the two heads are each located essentially the same minimum distance from molds closing over the heads to capture the parisons. Positioning the radial inner extrusion head a distance above the radial outer extrusion head permits flow of resin from extruders through the outer head to the inner head without increasing the width of the heads.

The coextrusion head assembly of the invention extrudes dual multi-layer parisons for capture and blow molding in vertical rotary machines with dual cavity molds. Two six layer parison coextrusion heads are provided permitting dual cavity molding of bottles with regrind layers and barrier layers and an adhesive layer to either side of the barrier layer. These heads are narrow and fit within the gap between open molds in the machine.

Resin flows to the radial inward coextrusion head through the assembly body without exterior flow pipes increasing the width of the body. Resin for the inner head is flowed into and through the radial outer head, to the inner head and to the annular flow passage for the inner head. Resin for the outer head is flowed into the outer head and to the annular flow passage for the outer head. Resin for the inner head flows through the outer head, past either side of the annular flow passage for the outer head and to the annular flow passage for the inner head.

A vertical rotary blow molding machine using dual cavity molds and a dual parison coextrusion head assembly per the invention efficiently manufactures bottles having regrind and barrier and adhesive layers. Dual mold production of multi-layer bottles doubles the production of conventional vertical rotary wheels with a single parison coextrusion head, considerably reducing cost. Floor space is saved and operator expense is reduced.

Other objects and features of the invention will become apparent as the description proceeds, especially when taken in conjunction with the accompanying drawings illustrating the invention, of which there are five sheets and one embodiment.

DESCRIPTION OF THE PREFERRED EMBODIMENT

Figure 1:
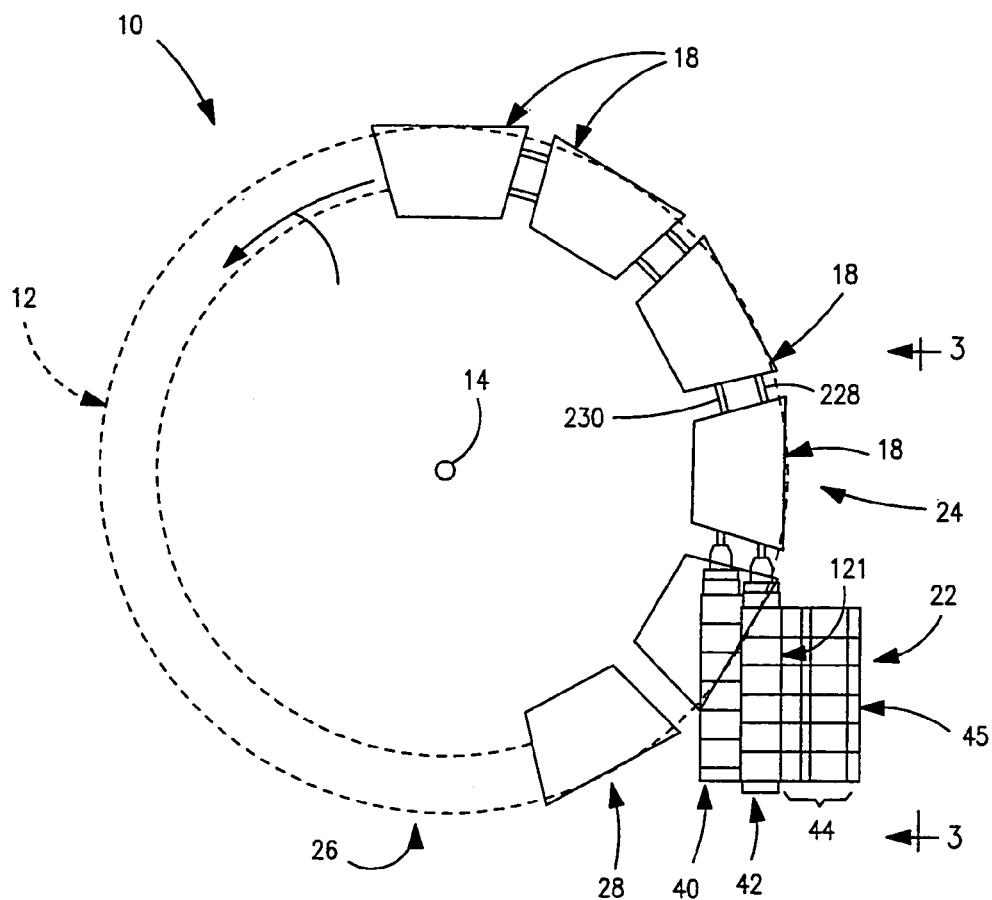
FIG. 1 is a side view of a dual parison vertical rotary blow molding machine, partially broken away.

Vertical rotary blow molding machine 10 includes a rotary wheel 12 having a main shaft 14 supported in fixed bearings and a drive (not illustrated) for continuously rotating the wheel about the axis of the main shaft in the direction of arrow 16.

The wheel includes a plurality of two cavity blow molds 18 spaced circumferentially around the wheel. Machine 10 has twelve molds 18. The number of molds on wheel 12 is not material to the invention. For instance, the wheel may have nine, twelve or twenty-four molds as required.

Each mold 18 includes two mold halves 20 supported on the circumference of the wheel 12 and moveable toward and away from each other along axes extending in directions parallel to the axis of rotation of the wheel at shaft 14. The mold supports and drives for opening and closing the molds are not illustrated. The wheel includes a frame supported on a floor.

Dual parison extrusion head assembly 22 is located at the 4:00 o'clock position on wheel 12 as shown in FIG. 1 and continuously extrudes inner and outer multi-layer parisons 230, 228 upwardly between open mold halves. Assembly 22 is mounted on the machine frame.

The drive for wheel 12 rotates open mold halves 20 up to either side of assembly 22 and closes each mold half to capture each parison in a mold cavity at parison capture station 24. After capture, the parisons are blown and cooled in the closed molds to set the plastic. The closed mold halves are opened at ejection station 26 for removal of the blown articles from between the molds. The open molds are rotated up to either side of assembly 22 and again close on the continuous parisons at station 24 to complete a cycle of operation. If desired, machine 10 may include a device for placing labels in the two recesses in each mold cavity at in mold labeling station 28 located between station 26 and assembly 22.

Figure 2:
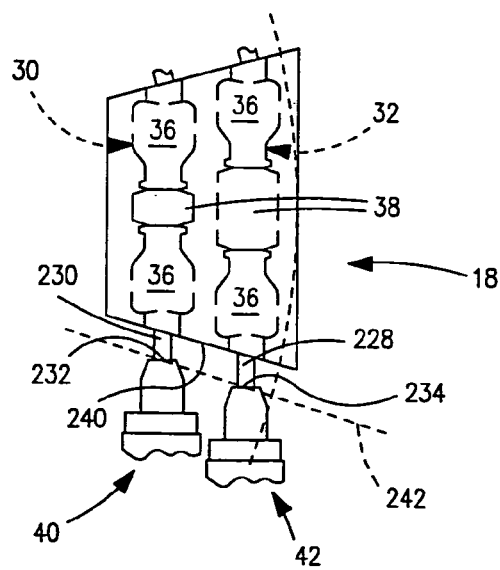
FIG. 2 is an enlarged view showing the parison capture station of the machine illustrated in FIG. 1.

Each mold 18 defines a radial inner mold cavity 30 and a radial outer mold cavity 32. The mold cavities are formed by recesses in the inner faces 34 of mold halves 20. The mold halves are trapezoidal in shape so that the radially inner cavity 30 has a circumferential length less than the circumferential length of the outer cavity 32. As shown in FIG. 2, inner cavity blow molds two like bottles 36 and outer cavity 32 also blows two like bottles 36. A blow dome 38 connects the bottles in each cavity. The bottom of each bottle is located adjacent a side edge of the mold so that the blow dome for the inner cavity is shorter than the blow dome for the outer cavity. The inner and outer mold cavities 30 and 32 may have different configurations if desired. Each cavity may be shaped to blow a single bottle. The bottles need not be identical. The outer cavity may be shaped to blow two bottles and the inner cavity shaped to blow a single bottle.

Figure 7:
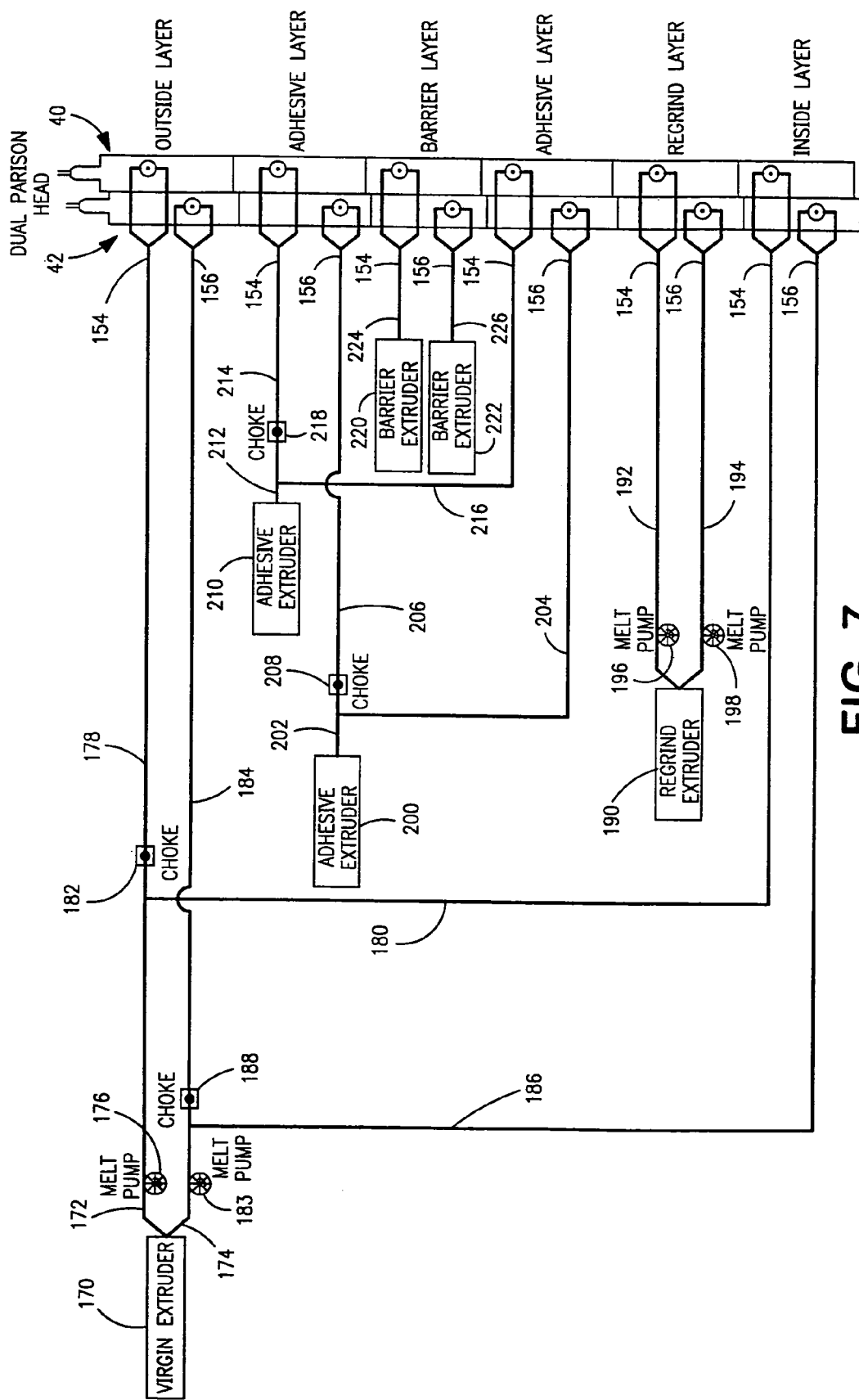
FIG. 7 illustrates the resin flow circuit and components for flowing resin to the dual parison heads.

Dual parison extrusion head assembly 22 includes side-by-side six layer coextrusion heads 40 and 42 and a manifold assembly 44 mounted on head 42 for flowing molten resin from extruders shown in FIG. 7 to heads 40 and 42 through the side of outer head 42 facing outwardly from the wheel. The heads 40 and 42 and assembly 44 form body 45. As illustrated in FIG. 1, each extrusion head 40 and 42 is oriented vertically and extrudes a parison vertically upwardly for capture in successive molds 18 at capture station 24. The extrusion heads 40 and 42 are of like design and extrude like multi-layer parisons for manufacture of like bottles.

As shown in FIG. 2, head 40 is mounted on base or spacer plate 46 which extends above plate 72. Plate 72 is mounted on the frame. Head 40 includes a series of upwardly extending conical bushings. First conical bushing 48 is supported on plate 46. Second, third, fourth, fifth and sixth conical bushings 50, 52, 54, 56, 58 and 60 are stacked on bushing 48. Die ring 62 is mounted on the top of bushing 60.

A stepped cylindrical mandrel 64 is supported on plate 46 and extends through cylindrical openings formed in bushings 48–60 to die ring 62 to define an annular flow passage 66 extending from the interface between bushings 48 and 50 to the die ring 62.

Die pin 68 is located in ring 62 and is mounted on the upper end of pin rod 70. Rod 70 extends through a central bore in mandrel 64, through base plate 46 and support plate 72 and into chamber 74. The lower end of rod 70 is connected to the piston rod of a hydraulic control cylinder 76 so that extension and retraction of the cylinder reduces and enlarges the circular extrusion mouth 232 between the pin and ring. Cylinder 76 is mounted on plate 112.

Figure 5:
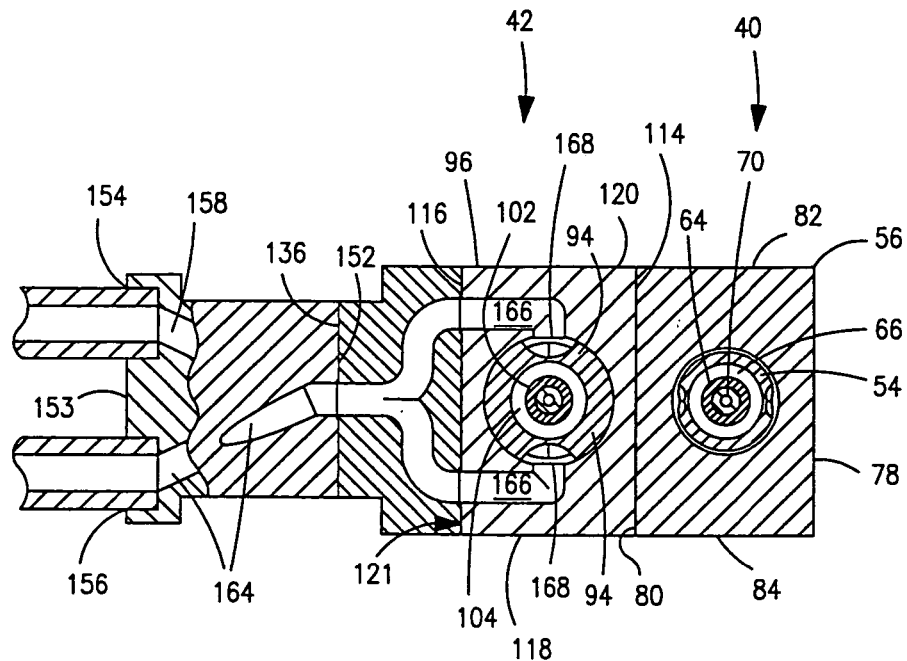
FIGS. 5 and 6 are sectional views taken along lines 5—5 and 6—6 of FIG. 4.
Figure 6:
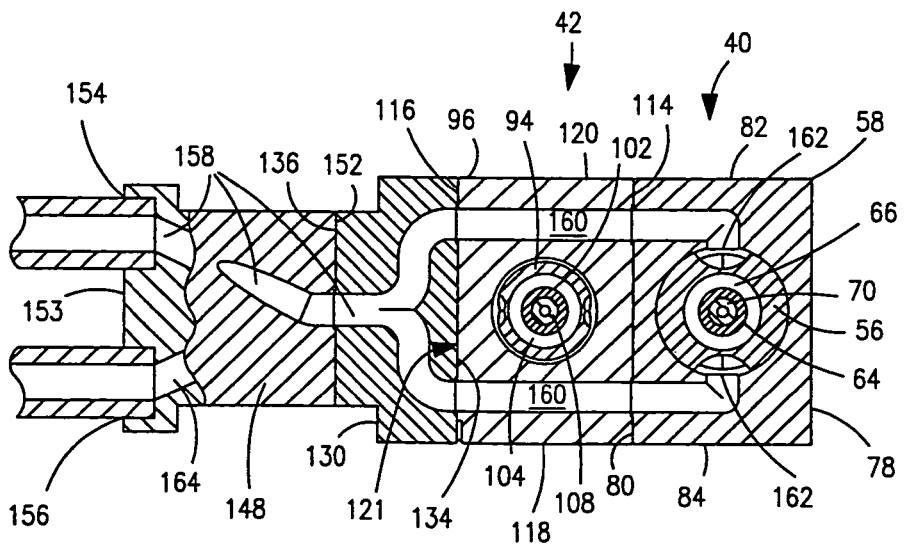

As illustrated in FIGS. 5 and 6, the bases of bushings 48–60 are rectangular in transverse section and all have flat, parallel radially inner and radial outer sides 78 and 80, and flat parallel lateral sides 82 and 84.

Head 42 is like head 40 but is mounted below head 40 on plate 72. Head 42 includes a base conical bushing 86 mounted on support plate 72 adjacent and below corresponding bushing 48. Head 40 is spaced above head 42 by the thickness of plate 46. Head 42 also includes conical bushings 88, 90, 92, 94 and 96 which correspond to and have the same height as bushings 50–58 of head 42. Bushings 88–96 are stacked together on bushing 86. Die ring 100 is mounted on the top of conical bushing 98. Stepped mandrel 102 extends through cylindrical openings in bushings 86–98 to define an annular flow passage 104 between the bushings and mandrel. The stepped mandrel is mounted on plate 72.

Die pin 106 is located in ring 100 and is mounted on the end of pin rod 108 which extends through a central bore in the mandrel and through plate 72 to chamber 74. The lower end of pin rod 108 is connected to the piston rod of hydraulic cylinder 110 mounted on support plate 112 secured to plate 72.

Cylinders 76 and 110 are preferably identical and are both mounted on plate 112 at the same vertical level. In order to mount the cylinders 76 and 110 together at the same level, rod 108 is longer than rod 70 by the thickness of plate 46. Mounting of the two hydraulic cylinders 76 and 110 at the same level facilitates connection of the cylinders to necessary hydraulic circuits and maintenance and repair of the cylinders.

Figure 4:
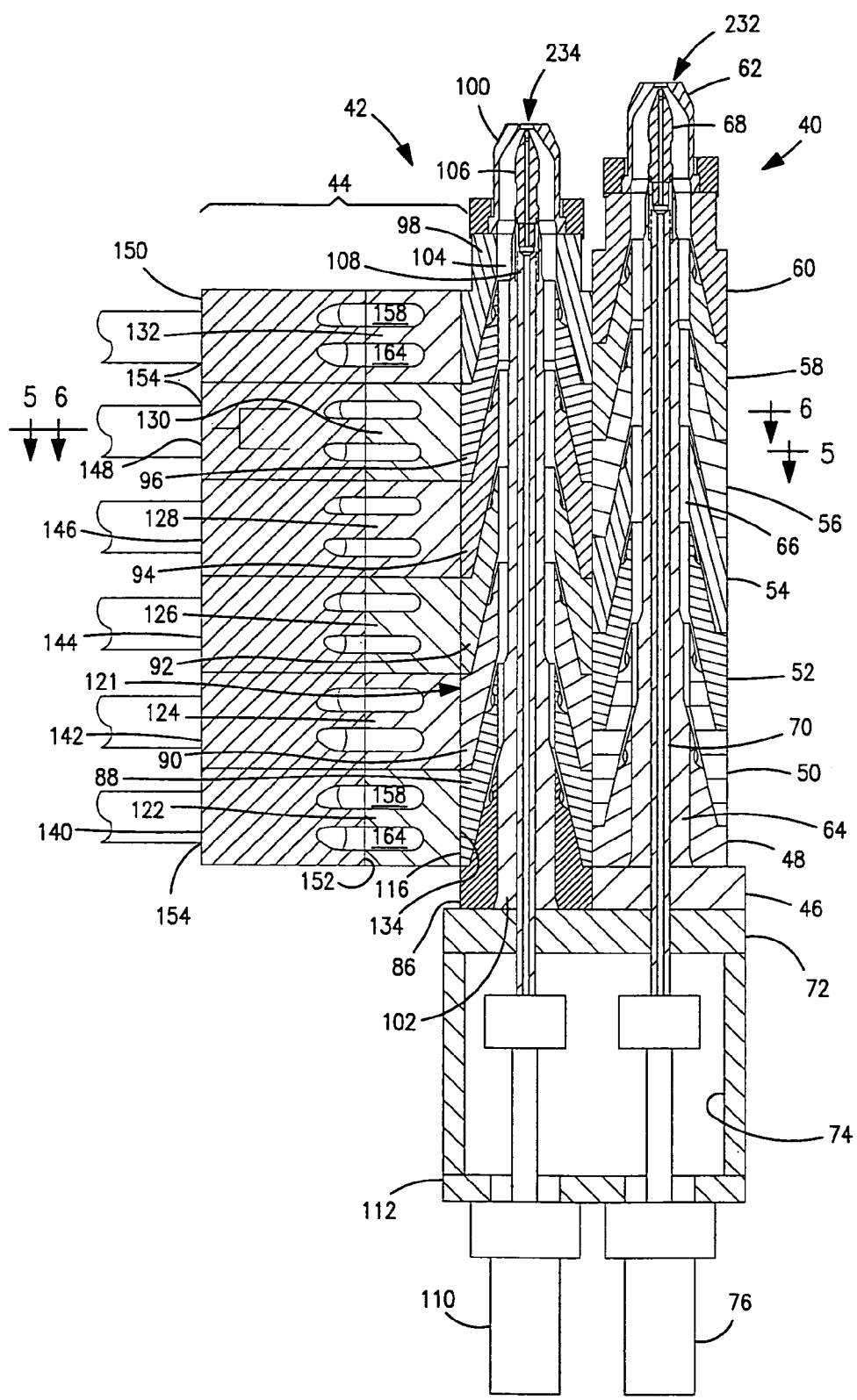
FIG. 4 is a sectional view taken along line 4—4 of FIG. 3.

As shown in FIGS. 5 and 6, the bases of conical bushings 86–98 are rectangular in shape and each include a flat radially inner side 114, flat radially outer side 116 facing away from the wheel and flat lateral sides 118 and 120. Sides 80 of the bushings in head 40 engage sides 114 of the bushings in head 42, although as illustrated in FIG. 4, the bushings in head 40 are located a distance above corresponding bushings in head 42. Outer sides 116 of bushings 86–98 form a flat surface 121 facing outwardly or away from the wheel. The conical surfaces of the bushings in head 40 are identical to the conical surfaces of corresponding bushings in head 42. The mandrels 64 and 102, rings 62 and 100 and pins 68 and 106 are identical.

Manifold assembly 44 includes a plurality of stacked divider blocks 122, 124, 126, 128, 130 and 132 having flat radial inner sides 134 engaging sides 116 of the bushings of head 42. The radial inner sides of blocks 122, 124, 126, 128, 130 and 132 engage the radial outer sides of bushings 88, 90, 92, 94, 96 and 98 respectively. See FIG. 4. The divider blocks have radially outer sides 136 which engage radial inner sides 138 of resin centering blocks 140–150. Radially inner sides 152 of blocks 140–150 engage the radially outer sides 116 of blocks 122–132 respectively.

Figure 3:
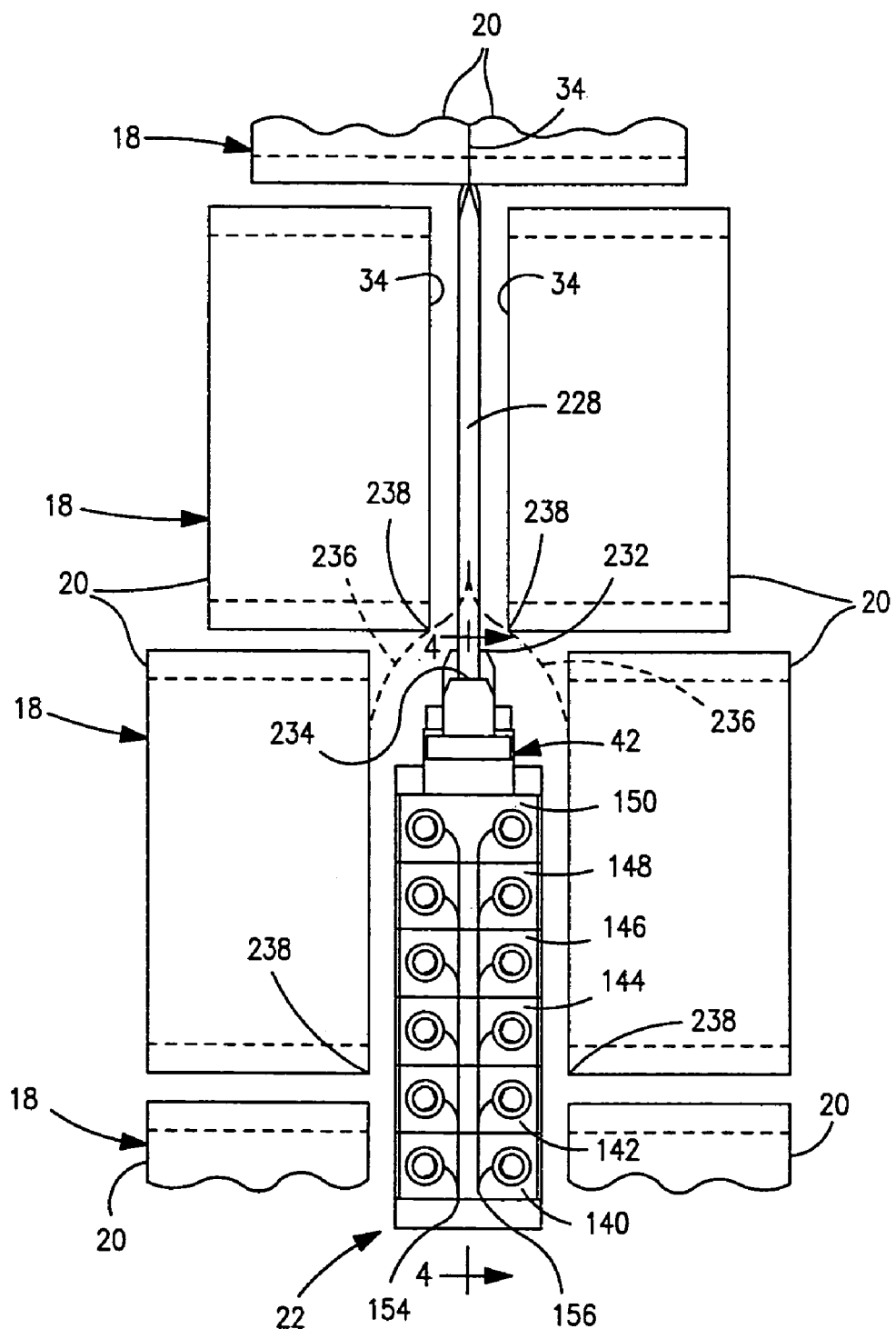
FIG. 3 is a side view taken along line 3—3 of FIG. 1.

As illustrated in FIG. 3, two resin inlet ports 154 and 156 are provided in the radial outer sides 153 of each block 140–150. Melt pipes connect ports 154 and 156 to the flow circuitry shown in FIG. 7. The ports 154, 156 in each block are located at the same level. Ports 154 are in one row adjacent one lateral side of surface 121 and flow resin to head 40. Ports 156 are in another row adjacent the other lateral side of surface 121 and flow resin to head 42.

In each block 140–150, a flow passage 158 extends from port 154 inwardly from the lateral side of the block and up to the lateral center of the block above port 154. Passage 158 then extends inwardly directly toward the vertical axes of heads 42 and 40 and into the adjacent block 122–132. In the adjacent block the passage 158 splits laterally into two equal area branches 160. Branches 160 extend parallel to sides 118 and 120 through the adjacent square bushing 88-98 past head 42 and into the adjacent bushing 50–60 of head 40 parallel to the lateral sides 82 and 84 thereof. Branch passages 160 pass to either side of the mandrel and flow passages of head 42 and open inwardly into two 180 degree-spaced inlet ports 162 for flowing resin into an annular, conical flow passage in the interface between two adjacent bushings of head 40. The resin flows around and up the annular conical flow passage to form a continuous 360 degree resin layer in flow passage 66. Balanced, equal flow of resin to each port 162 facilitates forming a uniform thickness resin layer.

In each block 140–150 a flow passage 164 extends from port 156 inwardly from the lateral side of the block and down to the lateral center of the block. Passage 164 then extends directly toward the vertical axes of heads 42 and 40 and into the adjacent block 122–132. In the adjacent block the passage 164 splits into two equal area branches 166. Branches 166 extend parallel to each other into the adjacent conical bushings 88–98 parallel to sides 118 and 120 and below passages 160. The passages then open into 180 degree-opposed inlet ports 168 for the upward annular, conical flow passage between the two adjacent conical bushings of head 42. This flow path is identical to the annular, conical flow path between adjacent bushings in head 40, previously described. The cross sectional areas of passages 158, branches 160, passages 164 and branches 166 are sized to accommodate the volume of resin flowed through the passages and branches, as described below.

Each flow head 40, 42 extrudes a six layer parison. The parison layers are arranged as follows:

| Layer | Resin |
|---|---|
| 1 (inner layer) | virgin |
| 2 | regrind |
| 3 | adhesive |
| 4 | barrier |
| 5 | adhesive |
| 6 (outer layer) | virgin |

The thickness of the layers may be varied as desired. Conventionally, the regrind layer is relatively thick and the adhesive and barrier layers are relatively thin. The volume of resin flowed to form the adhesive and barrier layers is low so that the passages and branches for these resins are smaller in diameter than the passages and branches for the virgin and regrind layers. See FIG. 4.

The virgin resin for the inner layer is flowed to heads 40 and 42 through the lower most centering block 140 and divider block 122. Resin for each successive layer in the parisons extruded by heads 40 and 42 is flowed through horizontally spaced pairs of centering and divider blocks as indicated in FIG. 4.

FIG. 7 illustrates the flow paths and components for supplying resin to the two coextrusion heads 40 and 42, although different configurations may be used if desired.

Extruder 170 extrudes virgin resin for forming the inner and outer layers of the parisons of both heads 40 and 42. Resin is extruded into melt pipe 172 for forming the inner and outer layers of the parison extruded by head 40 and into melt pipe 174 for forming the inner and outer layers of the parison extruded by head 42. Resin flows in pipe 172 through melt pump 176 and branches into pipe 178 extending to port 154 on the upper most centering block 150, through blocks 150 and 132, around head 42 and to the inlet ports 162 leading to an annular, conical flow passage for forming the outer virgin layer in head 40. Choke 182 is located in branch 176 between branch 180 and port 154.

Resin from extruder 170 also flows through melt pipe 174 through melt pump 176 and along branch 180 to port 154 of the lowermost centering block 140, and through block 140, into lowermost divider block 122 and is split and flows past head 42 to the inlet ports 162 for the inner virgin layer formed by head 40.

Virgin resin from extruder 170 is also flowed into pipe 174 through melt pump 183 and into branch pipes 184 and 186. Branch pipe 184 extends to port 156 on the top centering block 150, through the adjacent divider block 132 and to the opposed inlet ports 168 for the outer virgin layer of head 42. Choke 188 is located in branch pipe 184 between branch pipe 186 and inlet port 156. Virgin resin from extruder 170 and pump 183 is flowed through branch pipe 186 to the inlet port 156 of bottom centering block 140 for the inner layer and then to the opposed inlet ports 168 for the inner virgin layer of head 42.

Regrind extruder 190 flows molten regrind resin into melt pipes 192 and 194 leading to inlet ports 154, 156 of the regrind centering block 142 and to the inlet ports 162 and 168 for the conical flow passages forming the regrind layers in heads 40 and 42, as previously described. Melt pump 196 is located in pipe 192 and melt pump 198 is located in pipe 194.

Separate adhesive extruders 200 and 210 are provided. Extruder 200 flows adhesive resin through melt pipe 202 and branch melt pipe 204 to port 156 of adhesive centering block 144 and then to inlet ports 168 for forming the inner adhesive layer in head 42. Extruder 200 also flows adhesive resin through pipe 202 and branch melt pipe 206 to inlet port 156 of adhesive centering block 148 and to the inlet ports 168 for forming the lower adhesive layer in head 42. Choke 208 is provided in pipe 206 downstream of the junction with pipe 204.

Adhesive extruder 210 extrudes adhesive resin into melt pipe 212 and through branch pipe 214 to inlet port 154 of centering block 148, past head 42 and through adhesive inlet ports 162 shown in FIG. 6 for forming the outer adhesive layer for head 40. Choke 218 is provided in branch pipe 214. Branch pipe 216 joins pipe 212 and flows adhesive resin through inlet port 154 of centering block 144, past head 42 and through corresponding inlet ports 162 for forming the inner adhesive layer for head 40.

Each barrier resin extruder 220, 222 flows barrier resin to one head 40, 42 only. Barrier extruder 220 flows barrier resin through melt pipe 224 to inlet port 154 of centering block 146, past head 42 and then to inlet ports 162 in bushing 56 for forming the barrier layer for head 40. Barrier extruder 222 flows barrier resin through melt pipe 226 to inlet port 156 of centering block 146 and then to inlet ports 168 in bushing 94 for forming the barrier layer for head 42.

In the FIG. 7 hydraulic circuit, resin is flowed from the extruder to heads 40 and 42 through flow pipes. If desired, resin may be flowed through conduits other than flow pipes. For instance, the resin may be flowed through passages in a manifold.

Heads 40 and 42 extrude multi-layer parisons for capture in successive molds in cavities 30 and 32. As illustrated in FIG. 2, radially outer cavity 32 is longer than radially inner cavity 30. Accordingly, parison 228 extruded by head 42 is extruded at a rate faster than parison 230 is extruded by head 40. The thickness profiles for the two parisons depend upon the shapes of the cavities and the desired thickness of the plastic in the blown articles and are different for the two parisons 228, 230. The thickness of each parison is controlled by the position of the die pin in the die ring for the extruder flowing the parison. Hydraulic cylinders 76 and 110 control the positions of pins 68 and 106 in rings 62 and 100. The pressure of the resin supplied to the flow heads must also be adjusted to meet thickness and flow requirements as the die pin is moved to achieve desired parison thickness and extrusion rates.

Melt pumps 176 and 183 independently control the pressure of virgin resin supplied to the two heads. Melt pumps 196 and 198 independently control the pressure of regrind resin supplied to the heads. Extruders 200 and 210 independently control the pressure of adhesive resin supplied to the heads. Extruders 220 and 222 independently control the pressure of barrier resin supplied to the heads.

The outputs of the melt pumps 176,183,196, 198 and extruders 200, 210, 220 and 222 are adjusted to vary the pressure of the resin flowed to each head as required for programming parisons 228 and 230. When an extruder or melt pump flows resin to form two layers in one head, a choke 182, 188, 208 or 218 is provided in the pipe for the downstream, outer layer to compensate for the pressure drop along the length of the flow passage.

The extruders and melt pumps shown in FIG. 7 and cylinders 76 and 110 are programmed to control the flow of resins to heads 40 and 42 and the gaps of extrusion mouths 132 and 134 as required for blow molding bottles in cavities 30 and 32. The control system for the extruders, pumps and cylinders forms no part of the present invention.

The annular extrusion mouth 232 for radial inner head 40 is located a distance above annular extrusion mouth 234 for radially outer head 42. This distance is equal to the thickness of plate 46 and also the thickness of the rectangular bases of bushings 48–58 and 88–96.

As illustrated in FIG. 3, open mold halves 20 are rotated upwardly by wheel 12 past the narrow extrusion head assembly 22 and close rapidly above the assembly to capture parisons 228 and 230 in mold cavities 30 and 32. Dashed lines 236 shown in FIG. 3 illustrate the path of the trailing inner corners 238 of the mold halves during closing. FIG. 2 illustrates the position of the mold 18 when halves 20 have closed to capture the parisons. In this position the angled trailing side 240 of the trapezoidal shaped mold is located essentially the same minimum distance above mouths 232 and 234 in order to minimize the chord lengths of the parisons prior to capture by the mold. Minimized chord length reduces centrifugal displacement of the parison chord prior to capture. The high rotary speed of wheel 12 subjects the molten parisons extending from the extrusion heads to the preceding closed mold to lateral forces making it desirable to reduce the chord length.

Dual parison extrusion assembly 22 may be installed on rotary wheels having a number of molds greater or less than the twelve molds of wheel 12 and different trapezoidal shape. The illustrated vertical offset of heads 40 and 42 permits positioning of the mouths 232 and 234 sufficiently close to the trailing sides of the molds of other wheels when closed to capture the molten parisons in proper location in the dual mold cavities. The positioning of both extrusion mouths 232 and 234 as close as possible to the molds on closing also facilitates initial capture of the parisons by a mold during startup of machine 10.

As illustrated in FIGS. 4–6 the vertical offset of adjacent bushings in the two heads 40 and 42 facilitates flow of resin from the inlet ports 154 and 156 to the inner head 40 and outer head 42 in a compact design with a minimum width and without exterior melt pipes extending outside of body 45.

The weld seams where the edges of resin flowed onto the mandrel of each flow head join each other are located 90 degrees from the inlet ports 162, 168 for the layers. This means that the weld seams for the bottles blown from the parisons 228, 230 lie in the parting line plane of inner faces 34 of the mold halves, away from central panels on the bottles. Location of the weld seams away from the panels is desired, particularly when labels are affixed to the panels.

The operation of vertical rotary blow molding machine 10 will now be described.

The drive for wheel 12 rotates the wheel at a continuous high rotary speed. Heads 40 and 42 continuously extrude parisons vertically upwardly in the direction of rotation for capture by molds 18. Open mold halves 20 are rotated up to either side of the extrusion heads as shown in FIGS. 1 and 3 and capture the parisons at a short distance above the extrusion mouths 232 and 234 as illustrated in FIG. 2. The open molds pass freely to either side of the narrow coextrusion flow heads.

After capture of the parisons as described, blow needles carried in each mold 18 puncture blow dome portions of the parisons and blow the parisons to form bottles or other blow molded containers in the inner and outer mold cavities. The blown bottles cool during rotation of the wheel to set the plastic in the mold by the time the mold reaches ejection station 26. The molds are opened at the ejection station and the blown bottles are removed from between the molds for subsequent processing. If desired, labels may be placed in the recesses in the open mold halves at in mold labeling station 28. The open molds then move up past to either side of heads 40 and 42 to complete the cycle of operation.

Resin for both coextrusion heads 40 and 42 flows into inlet ends of passages in the bushings 88–98 of head 42 at outwardly facing surface 121. Resin flows through the passages in the manifold assembly 44 to the inlet ends at surface 121 and thence along the flow passages in the two coextrusion heads. As illustrated in FIG. 3, open mold halves 20 are rotated past opposite sides of the two heads in order to capture the two parisons. If desired, the inlet ends of resin flow passages in head 42 may open on lateral sides 118 or 120 of the head for connection to conduits connected to the extruders, provided the openings and conduits are out of the path of movement of the open molds.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention:

1. An extrusion head assembly for a vertical rotary blow molding machine using molds having radially inner and radially outer mold cavities; the assembly comprising a body having an outer side; a first extrusion head in the body, the first extrusion head having a first head annular flow passage and a first head mouth opening in the direction of rotation of the wheel for extruding a first parison for capture in inner mold cavities; a second extrusion head in the body, the second extrusion head having a second head annular flow passage and a second head mouth opening in the direction of rotation of the wheel for extruding a second parison for capture in outer mold cavities, the second extrusion head located outwardly of the first extrusion head and between the first extrusion head and the outer side of the body; a first resin passage in said body, said first resin passage extending from an inlet end at the outer side, into the body, past the second head flow passage, and to the first head flow passage; and a second resin passage in said body, said second resin passage extending from an inlet end at the outer side of the body, into the body and to the second head flow passage.

2. The assembly as in claim 1 wherein said resin passages are at different heights.

3. The assembly as in claim 1 wherein the first head mouth is above the second head mouth; and said first resin passage is above said second resin passage.

4. The assembly as in claim 1 wherein said first and said second resin passages are each located entirely in said body.

5. The assembly as in claim 1 including a third resin passage in said body, said third resin passage extending from an inlet end into the body, past the second head flow passage and to the first head flow passage.

6. The assembly as in claim 5 including a fourth resin passage in said body, said fourth resin passage extending from an inlet end into the body and to the second head flow passage.

7. The assembly as in claim 6 wherein said first and third resin passages join the first head flow passage at first and second head ports, such ports spaced apart around such flow passage; and said second and fourth resin passages join the second head flow passage at third and fourth head ports, such ports spaced apart around such flow passage.

8. The assembly as in claim 6 wherein said first and third resin passages are located at a first height; and said second and fourth resin passages are located at a second height different from said first height.

9. The assembly as in claim 6 including a manifold on said body outwardly of said second head, the manifold including a first inlet port for flowing resin to the first extrusion head, a second inlet port for flowing resin to the second extrusion head, a first branched manifold passage extending from the first inlet port to the inlet ends of the first and third resin passages; and a second branched passage extending from the second inlet port to the inlet ends of the second and fourth resin passages; wherein resin supplied to the first inlet port is flowed through the first branched passage and the first and third resin passages to the first head flow passage, and resin supplied to the second inlet port flows through the second branched passage and said second and fourth resin passages to second head flow passage.

10. The assembly as in claim 9 wherein said first and third resin passages are above said second and fourth resin passages.

11. The assembly as in claim 9 wherein said manifold includes a manifold surface facing away from said extrusion heads, said inlet ports located on said manifold surface.

12. The assembly as in claim 1 including a resin extruder; a first flow conduit connecting the extruder to the first resin passage; a second flow conduit connecting the extruder to the second resin passage; a first melt pump located in said first flow conduit; and a second melt pump located in said second flow conduit; wherein said melt pumps isolate the resin pressure in each flow conduit from the pressure in the other flow conduit and from the pressure in the extruder.

13. The assembly as in claim 1 wherein the first head mouth is located above the second head mouth.

14. The assembly as in claim 1 wherein each extrusion head comprises a coextrusion head.

15. The assembly as in claim 14 wherein the first head mouth is located above the second head mouth.

16. The assembly as in claim 15 wherein the first resin passage is located above the second resin passage.

17. The assembly as in claim 14 wherein each coextrusion head includes a plurality of nested conical bushings.

18. The assembly as in claim 17 wherein each bushing has the same height.

19. The assembly as in claim 17 wherein each coextrusion head includes a mandrel, a die ring on the top bushing, and a die pin located within said ring, the pin and ring of each head defining the size of the mouth for the head; a control cylinder located below the mandrel, a die rod joined to said die pin and extending through the mandrel to the control cylinder; the first head mouth located above the second head mouth; and the die rod of the second head being longer than the die rod of the first head, wherein said control cylinders are located at the same level.

20. The assembly as in claim 1 wherein said inlet ends are located out of the path of movement of the molds.

21. The assembly as in claim 1 wherein said resin passages are in said heads.

22. A coextrusion head assembly for a vertical rotary blow molding machine using a plurality of molds each having a radially inner mold cavity and a radially outer mold cavity; the assembly comprising a body having an outer side; a first coextrusion head in the body, the first extrusion head including a first head annular flow passage and a first head extrusion mouth for extruding a first multi-layer parison for capture in inner mold cavities; a second coextrusion head in the body, the second coextrusion head located outwardly of the first coextrusion head and between the first coextrusion head and the outer side of the body, the second coextrusion head including a second head annular flow passage and a second extrusion mouth for extruding a second multi-layer parison for capture in outer mold cavities; a first resin passage for each layer in the first multi-layer parison, said first resin passages each including an inlet end at the outer side of the body and extending from such end through the body, past the second extrusion head and to the first head flow passage; and a second resin passage for each layer in the second multi-layer parison, said second resin flow passages each including an inlet end at the outer side of the body and extending from such end through the body to said second head flow passage.

23. The assembly as in claim 22 wherein all said passages are in said heads.

24. The assembly as in claim 22 wherein the second head extrusion mouth is located above the first head extrusion mouth.

25. The assembly as in claim 24 wherein each coextrusion head extrudes a parison having the same number of resin layers; and the resin passage supplying resin for one layer in the first coextrusion head is located above the resin passage supplying resin to a corresponding layer in the second coextrusion head.

26. The assembly as in claim 22 wherein all said inlet ends are located out of the path of movement of the molds.

27. The assembly as in claim 22 wherein each coextrusion head includes a pair of 180 degree-opposed head inlet ports for each parison layer; and said first resin passages extend past the second head flow passage and to said first head inlet ports; and said second resin passages extend to said second head inlet ports.

28. The assembly as in claim 27 wherein said first resin passages extend past opposite sides of said second head.

29. The assembly as in claim 27 including a manifold on said body, the manifold including a plurality of first manifold inlet ports and a first branched manifold passage connecting each first manifold inlet port to two first resin passages; and a plurality of second manifold inlet ports and a second branched manifold passage connecting each second manifold inlet port to the two second resin passages.

30. The assembly as in claim 29 wherein the first manifold inlet ports are located in a row and the second manifold inlet ports are located in a row.

31. The assembly as in claim 22 wherein each coextrusion head includes a mandrel and a plurality of nested conical bushings surrounding the mandrel for flowing resin layers onto the mandrel; said mandrels and bushings in each head being identical.

32. The assembly as in claim 22 including a resin extruder; a first melt conduit extending from the resin extruder to one of said first flow passages; a second melt conduit extending from the extruder to one of said of second flow passages; and two melt pumps, each melt pump located in one of said melt conduits.

33. A method of blow molding articles in a rotary blow molding machine having a plurality of like dual cavity molds each defining a radially inner cavity and a radially outer cavity; a wheel supporting the molds; a drive for rotating the wheel; a drive for closing the molds to capture a parison in each mold cavity and for opening the molds to eject blow molded articles; and an extrusion assembly having a body, radially inner and radially outer extrusion heads in the body, each extrusion head including an annular flow passage and a flow mouth, the heads extruding inner and outer parisons for capture in the radially inner and radially outer cavities when the molds are closed on the parisons, and a source of resin to be extruded; comprising the steps of:

A) flowing resin from the source along a first resin passage in the body extending past the radially outer extrusion head and to an inlet port for the radially inner extrusion head for extrusion in the inner parison;

B) flowing resin from the source along a second resin passage in the body extending to an inlet port for the radially outer extrusion head for extrusion in the outer parison;

C) rotating successive open molds past the sides of said inner and outer heads and to either side the inner and outer parisons;

D) closing successive open molds on inner and outer parisons to capture portions of said parisons in the radially inner and radially outer cavities;

E) blowing the parisons in the cavities to form blow molded articles; and

F) opening the molds and ejecting the blow molded articles.

34. The method of claim 33 including the step of:

G) flowing resin for the inner extrusion head past one side of the flow passage for the outer extrusion head.

35. The method of claim 33 including the step of:

H) flowing resin for the radially inner extrusion head past opposite sides of the flow passage for the radially outer extrusion head.

36. The method of claim 33 including the steps of:

I) flowing resin to the radially inner head through spaced head inlet ports; and J) flowing resin to the radially outer extrusion head through spaced head inlet ports.

37. The method of claim 33 including the steps of:

L) flowing a plurality of different resins to each extrusion head; and

M) extruding a multi-layer parison from each extrusion head.

* * * * *